US008256939B2

(12) United States Patent
Onoda et al.

(10) Patent No.: US 8,256,939 B2
(45) Date of Patent: Sep. 4, 2012

(54) STRADDLE-TYPE VEHICLE

(75) Inventors: Akira Onoda, Shizuoka (JP); Yasuo Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 523 days.

(21) Appl. No.: 11/961,045

(22) Filed: Dec. 20, 2007

(65) Prior Publication Data

US 2008/0158895 A1  Jul. 3, 2008

(30) Foreign Application Priority Data

Dec. 28, 2006 (JP) ................................. 2006-356593

(51) Int. Cl.
*F21V 33/00* (2006.01)
(52) U.S. Cl. .................... 362/473; 362/540; 362/544
(58) Field of Classification Search .................. 362/459, 362/473, 540–544, 547, 475, 476
See application file for complete search history.

(56) References Cited

U.S. PATENT DOCUMENTS

| 3,941,994 | A | * | 3/1976 | Petty et al. | 362/506 |
|---|---|---|---|---|---|
| 5,072,339 | A | * | 12/1991 | Shimojo | 362/473 |
| 5,609,407 | A | * | 3/1997 | Yanagihara et al. | 362/547 |
| 6,042,255 | A | * | 3/2000 | Kibayashi | 362/547 |
| 6,814,477 | B2 | * | 11/2004 | Yamaguchi et al. | 362/497 |
| 7,073,618 | B1 | * | 7/2006 | Song | 180/219 |
| 7,108,407 | B2 | * | 9/2006 | Kashiwagi | 362/473 |
| 7,341,364 | B2 | * | 3/2008 | Yamaguchi et al. | 362/473 |
| 2003/0063472 | A1 | * | 4/2003 | Ban et al. | 362/473 |
| 2004/0130901 | A1 | * | 7/2004 | Kashiwagi | 362/473 |

FOREIGN PATENT DOCUMENTS

| EP | 1538022 A2 | * | 6/2005 |
| JP | 59073334 A | * | 4/1984 |
| JP | 2003-081162 | | 3/2003 |

* cited by examiner

*Primary Examiner* — Hargobind S Sawhney
(74) *Attorney, Agent, or Firm* — Keating & Bennett, LLP

(57) ABSTRACT

A straddle-type vehicle that reliably inhibits entry of fluid to a tail lamp unit. An extending member protrudes upward from a rear fender and extends in a vehicle width direction. The extending member covers a sealing member of flasher lenses and a tail lamp lens when the motorcycle is viewed from the rear. A gutter guides fluid that enters a space between the extending member and the tail lamp unit.

9 Claims, 9 Drawing Sheets

STRADDLE-TYPE VEHICLE

RELATED APPLICATIONS

This application claims the benefit of priority under 35 USC 119 of Japanese patent application no. 2006-356593, filed on Dec. 28, 2006, which application is hereby incorporated by reference in its entirety.

BACKGROUND OF THE INVENTION

1. Field of the Invention

The present invention relates to a tail lamp unit that is disposed above a rear wheel of a straddle-type vehicle and that includes a lens member, and a lamp body that is assembled together with the lens member.

2. Description of Related Art

In straddle-type vehicles such as a motorcycle, a tail lamp unit may be disposed at a rear end section of the vehicle. The tail lamp unit typically integrates a tail lamp, flashers and a license lamp that radiates light on to a license plate.

The tail lamp unit generally includes a lens member assembled together with a lamp body. Adhesive or the like is used to seal a section where the lens member and the lamp body abut to prevent entry of moisture, dirt or the like from the outside into the tail lamp unit.

In one example, a rear surface covering member provided at a periphery of the tail lamp unit covers a sealing member of the lens member and the lamp body (see, for example, page 4 and FIG. 8 of JP-A-2003-81162). However, there is room for improvement in terms of preventing entry of rain water or the like in to the tail lamp unit.

SUMMARY OF THE INVENTION

The present invention has been devised in light of these circumstances and provides a straddle-type vehicle that more reliably inhibits entry of rain water or the like into the tail lamp unit.

According to a first aspect of the invention, a straddle-type vehicle includes a rear wheel, a tail lamp unit including a lens member and a lamp body, and a rear fender disposed between the rear wheel and the tail lamp unit. A sealing member that seals the lens member and the lamp body at a lower section of the tail lamp unit is formed in the tail lamp unit. A vehicle width direction wall that protrudes upwards from the rear fender and extends in the vehicle width direction covers the sealing member when the vehicle is viewed from the rear.

In this straddle-type vehicle described above, the vehicle width direction wall included in the rear fender covers the sealing member that seals the lens member and the lamp body. As a result, entry of rain water or the like into the tail lamp unit is reliably inhibited. In addition, it is difficult to see the sealing member of the tail lamp unit without using a separate member.

In one embodiment, front-rear direction walls are connected with tip sections of the vehicle width direction wall and extend toward the front of the vehicle.

In this embodiment, the rear fender may include a fluid guiding passage that guides fluid that has entered a space formed by the tail lamp unit, the vehicle width direction wall and the front-rear direction walls toward the front of the vehicle.

A further embodiment includes a body frame covered by a body cover. The tail lamp unit and the body cover are attached to the body frame by an attachment bracket.

Another embodiment includes a body frame covered by a body cover. The tail lamp unit has a lens surface that radiates light onto a license plate. The lens surface is provided at a bottom surface of the tail lamp unit and extends in a generally horizontal direction.

In this embodiment, a wall may protrude downward at a periphery of the lens surface.

Still further, in this embodiment, walls may be formed at both sides of the lens surface.

According to the invention, a straddle-type vehicle is provided that more reliably inhibits entry of rain water or the like into the tail lamp unit.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
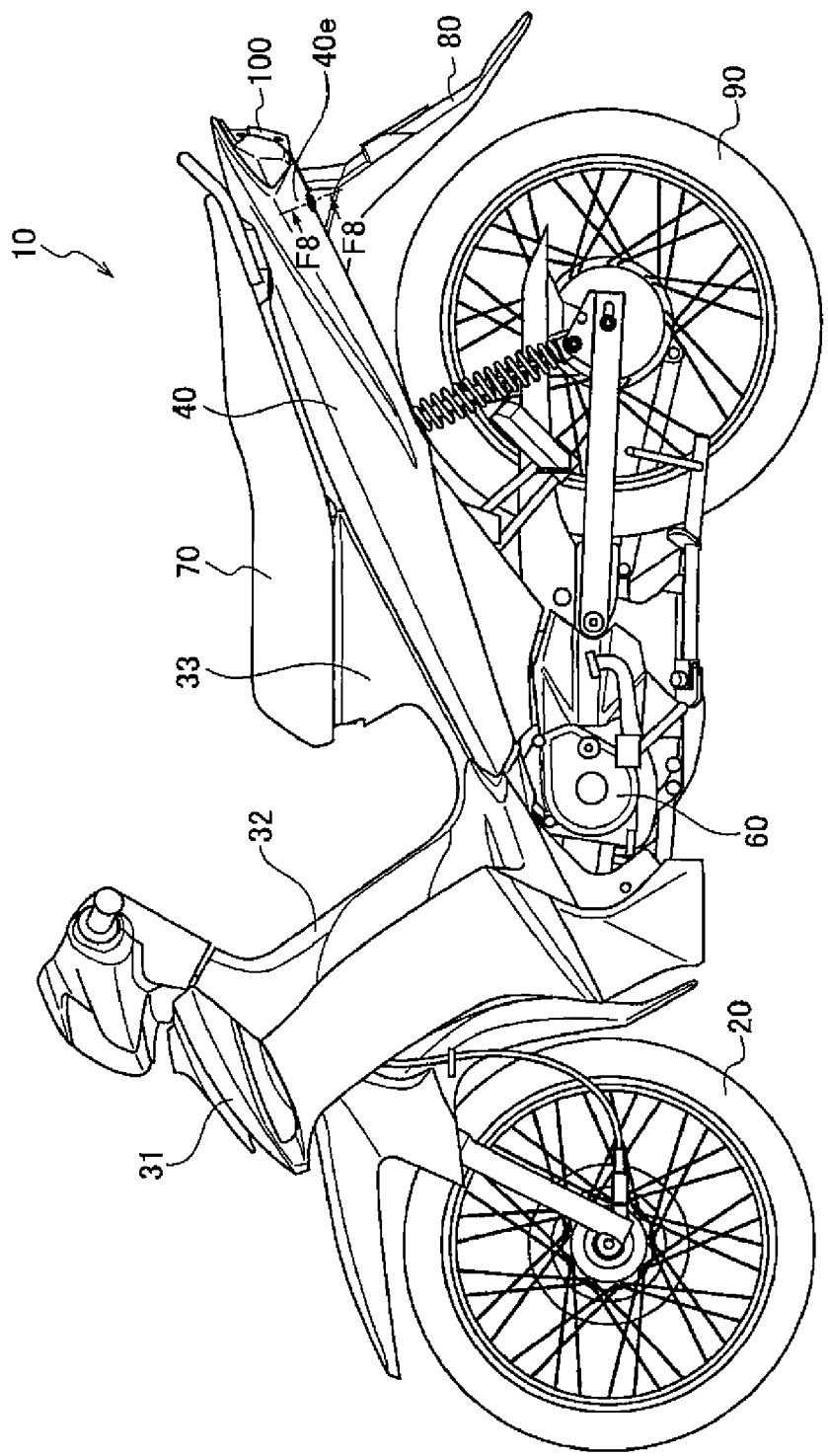
FIG. 1 is a left side view of a motorcycle according to an embodiment of the invention.

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different to the real object. Specific dimensions and the like can be determined from the following description. In addition, the relationship and scale of dimensions and the like may be different from drawing to drawing.

(Structure of Straddle-Type Vehicle)

Figure 2:
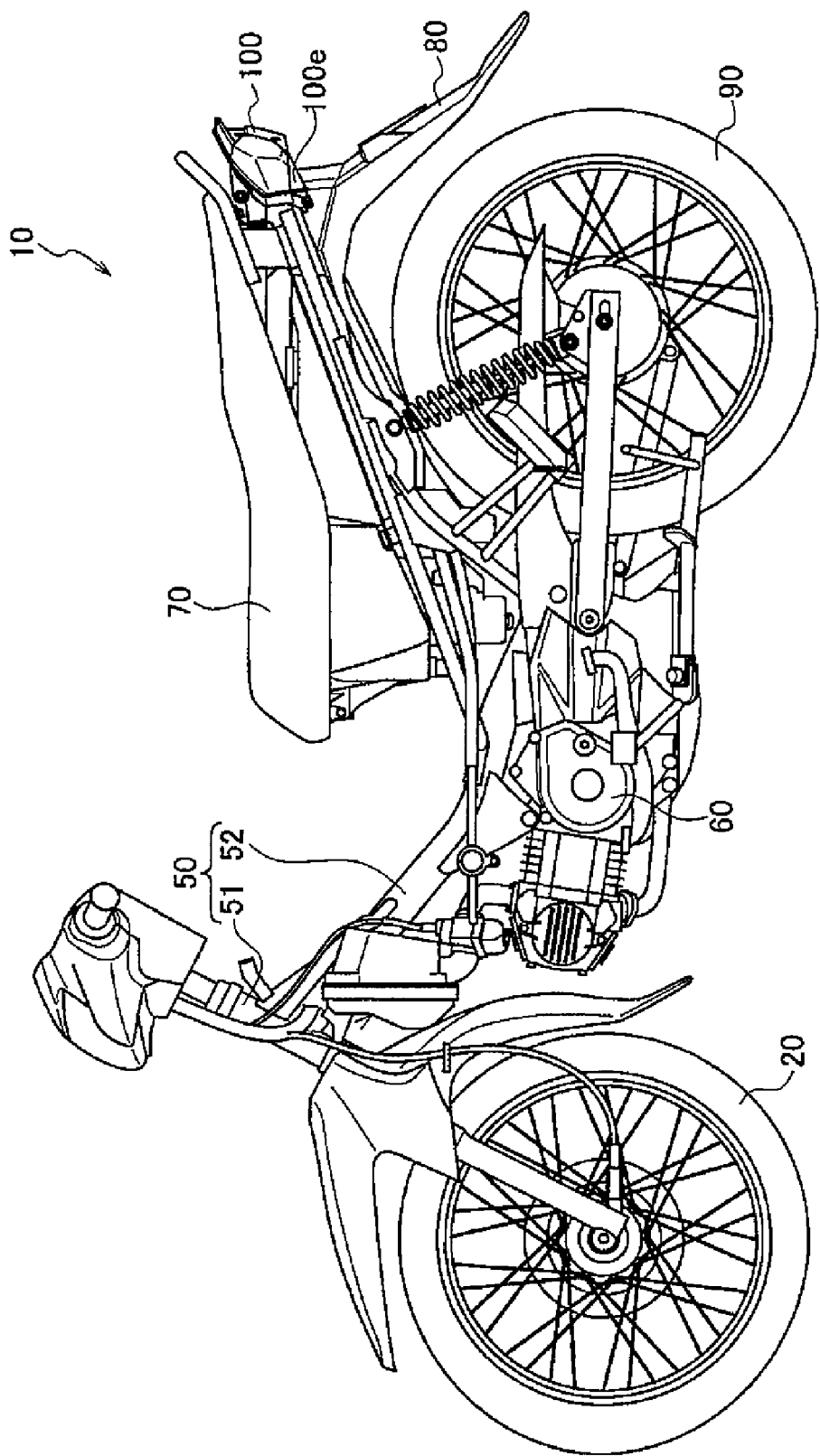
FIG. 2 is a left side view of the motorcycle of FIG. 1 with vehicle body covers removed.

FIG. 1 is a left side view of a motorcycle 10 according to an embodiment of the invention. FIG. 2 is a left side view of motorcycle 10 with vehicle body covers removed. Motorcycle 10 is an underbone motorcycle with a body frame 50 that is disposed further downwards as compared to a standard straddle-type motorcycle. Motorcycle 10 has a front wheel 20 and a rear wheel 90. An engine 60 generates driving force that drives rear wheel 90.

Body frame 50 includes a down tube 52 that extends downward from a steering head pipe 51. Body frame 50 is covered by a plurality of body covers including a body cowl 31, a leg shield 32, an under seat cover 33 and a side cover 40.

Body cowl 31 is disposed forward of steering head pipe 51. Leg shield 32 is disposed forward of the legs of a rider who is mounted on a seat 70. Body cowl 31 is assembled together with leg shield 32. Under seat cover 33 is disposed below seat 70. Seat 70 can be turned about a turning shaft to access a luggage storage box and a fuel tank disposed beneath seat 70.

Side covers 40 are disposed on left and right sides of motorcycle 10. Only the left side cover 40 is shown in FIG. 1; the right side cover has a substantially symmetrical shape.

A rear fender 80 is disposed above rear wheel 90. In addition, a tail lamp unit 100 is disposed at motorcycle 10, more particularly, a rear section of body frame 50. Rear fender 80 is disposed between rear wheel 90 and tail lamp unit 100. Rear fender 80 is disposed to the radial direction outer side of rear wheel 90, and inhibits rain water or the like thrown up by rear wheel 90 from being scattered.

(Structure of Tail Lamp Unit)

Figure 3:
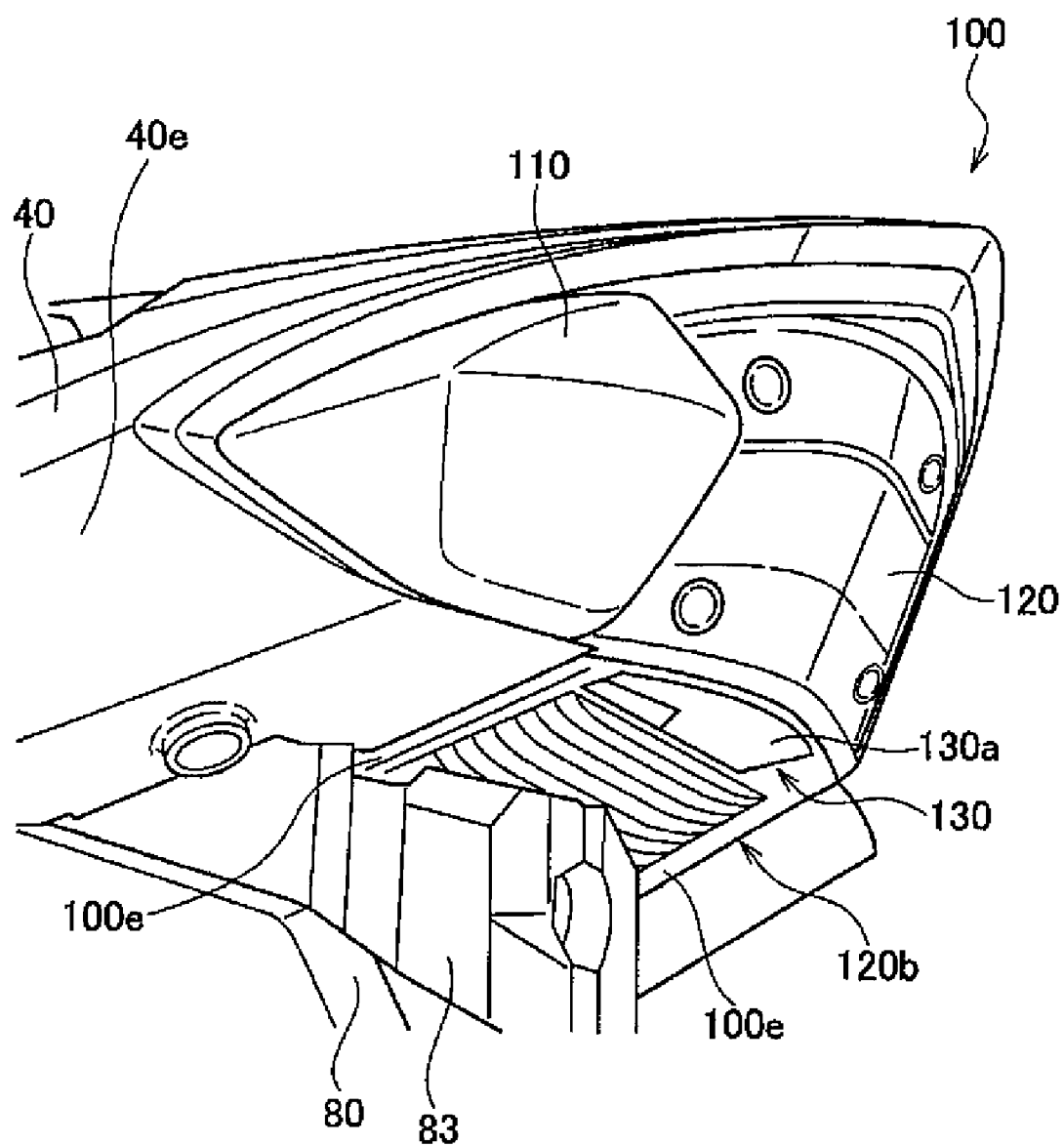
FIG. 3 is an enlarged perspective view of a tail lamp unit and a periphery of the tail lamp unit according to an embodiment of the invention.
Figure 4:
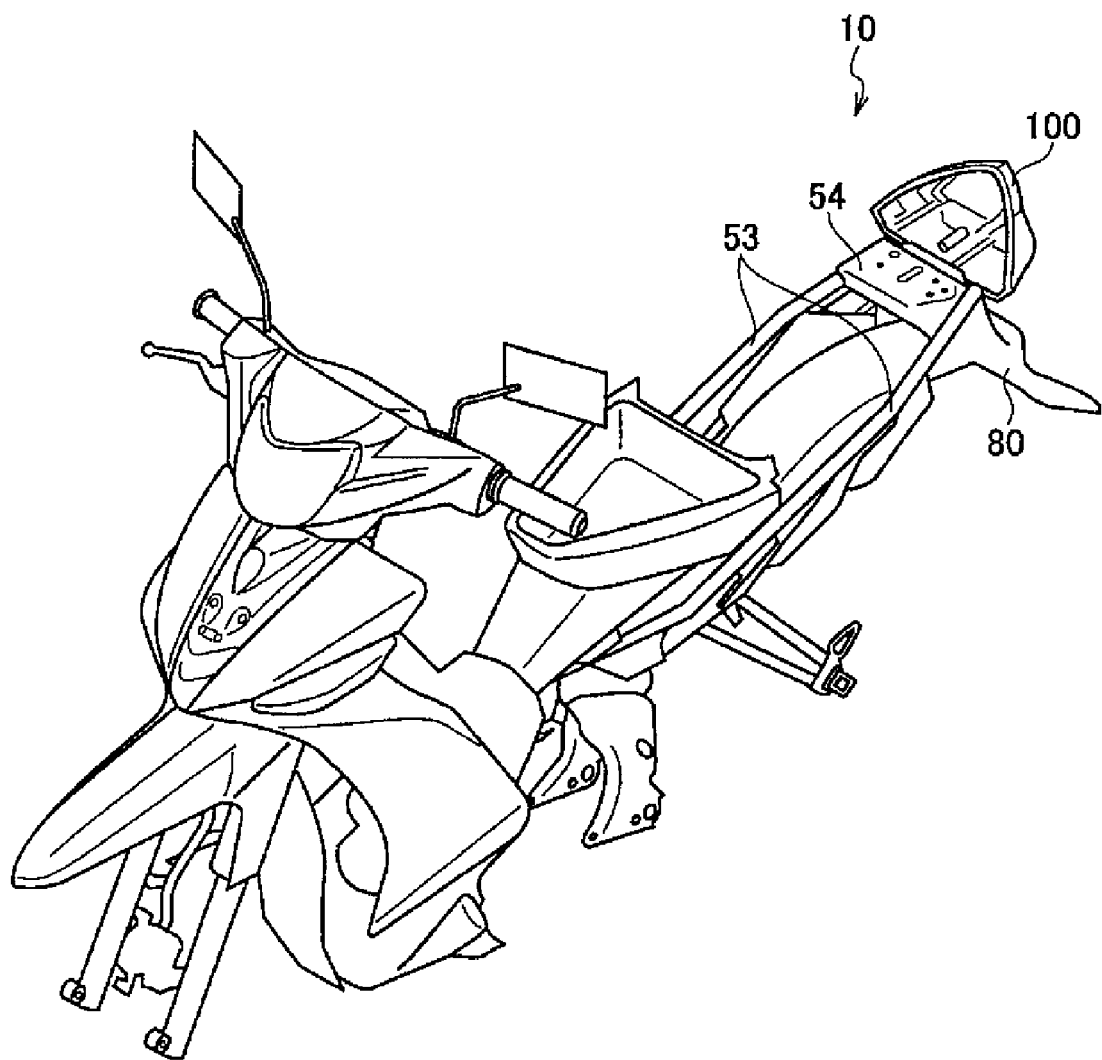
FIG. 4 is an exploded schematic perspective view of the motorcycle according to an embodiment of the invention.
Figure 5:
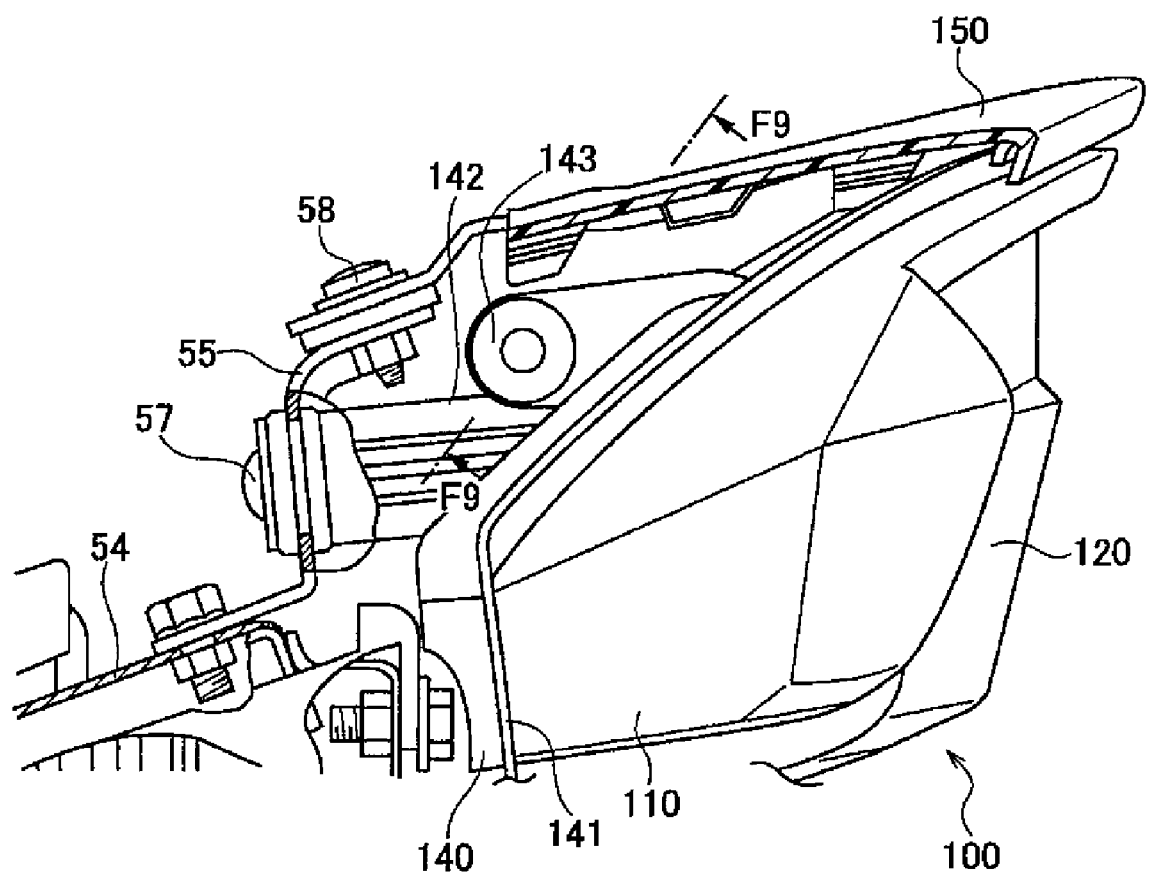
FIG. 5 is a perspective view of a rear fender according to an embodiment of the invention.

Next, the structure of tail lamp unit 100 is explained. FIG. 3 is an enlarged perspective view of tail lamp unit 100 and its vicinity. FIG. 4 is an exploded schematic perspective view of motorcycle 10. FIG. 5 is an enlarged side view of tail lamp unit 100 and its vicinity.

As can be seen from FIGS. 3 and 4, tail lamp unit 100 is disposed at a rear end of motorcycle 10. Tail lamp unit 100 includes flasher lenses 110 and a tail lamp lens 120. Flasher lenses 110 are on the sides of tail lamp lens 120. Flasher lenses 110 and tail lamp lens 120 form a lens member. FIG. 3 shows only the left side flasher lens 110; the right side flasher lens has the same configuration. A license lamp member 130 is provided in a bottom surface 120b of tail lamp lens 120.

Flasher lenses 110 extend along rear and side surfaces of motorcycle 10. Flasher bulbs are provided inside flasher lenses 110. In one embodiment, an orange colored light radiates from flasher lenses 110. Tail lamp lens 120 extends along the rear surface of motorcycle 10. A tail lamp bulb is provided inside tail lamp lens 120. In one embodiment, red light is radiated from tail lamp lens 120.

License lamp member 130 has a lens surface 130a, and radiates light onto a license plate (not shown). The license plate is attached to rear fender 80. Lens surface 130a is substantially transparent, and in one embodiment, generally white light is radiated downwards from lens surface 130a. In this embodiment, the tail lamp bulb is used to irradiate the license plate. Thus, the tail lamp bulb is used in a dual purpose manner and no special bulb is needed for the license lamp.

Lens surface 130a extends in a generally horizontal direction so that it cannot be seen from the rear of motorcycle 10. As can be seen from FIGS. 2 and 3, downwardly protruding side walls 100e (wall members) are formed on left and right sides of lens surface 130a. Side walls 100e extend along a lower edge 40e of side cover 40 when motorcycle 10 is viewed from the side.

An extending member 83 extends from rear fender 80 at the lower side of tail lamp unit 100. Extending member 83 abuts against bottom surface 120b of tail lamp lens 120.

Side cover 40 covers the side of tail lamp unit 100, and more particularly covers a section of flasher lenses 110.

As can be seen from FIG. 4, tail lamp unit 100 is attached to a rear stay 54. An attachment bracket 55 attaches tail lamp unit 100 to rear stay 54 (FIG. 5). Rear stay 54 extends to body frame 50, more specifically, extends between a pair of left and right seat rails 53 that are connected to down tube 52.

As shown in FIG. 5, tail lamp unit 100 includes a lamp body 140 (lamp body member) that is assembled together with flasher lenses 110 and tail lamp lens 120. A sealing member 141 (sealing portion) that seals flasher lenses 110 and lamp body 140 is formed in lamp body 140. Sealing member 141 is formed using, for example, hot melt adhesive. Alternatively, sealing member 141 may be formed, for example, using urethane foam that has a bar-like shape with a generally circular cross section.

Sealing member 141 is formed along an outer edge of flasher lenses 110 and tail lamp lens 120, and more specifically is formed along an outer edge of tail lamp unit 100 that includes a lower section and side sections of tail lamp unit 100.

Figure 6:
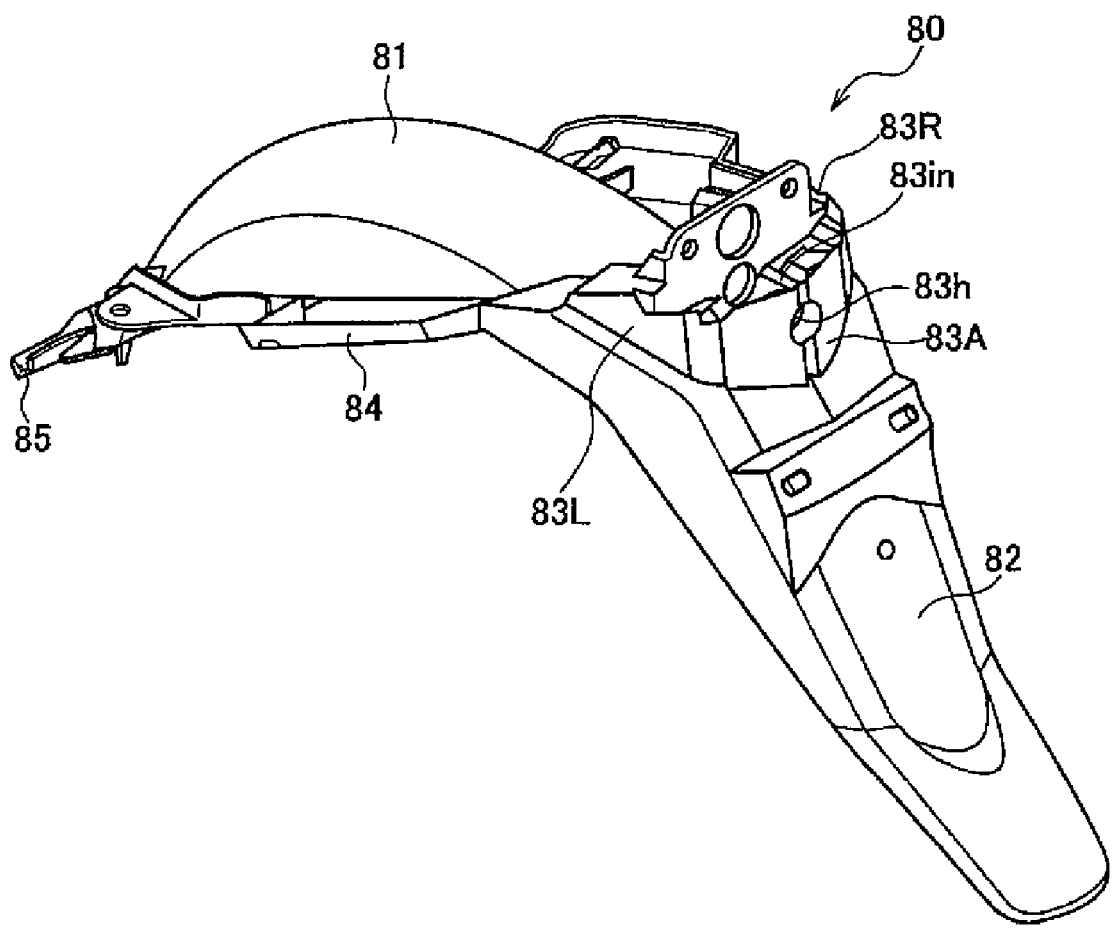
FIG. 6 is a perspective view of a rear fender unit according to an embodiment of the invention.

As can be seen from FIG. 6, sealing member 141 at the lower section of tail lamp unit 100 is covered by a vehicle width direction wall 83A when motorcycle 10 is viewed from the rear. Thus, sealing member 141 at the lower section of tail lamp unit 100 is not visible when motorcycle 10 is viewed from the rear.

Sealing member 141 at the side sections of tail lamp unit 100 is covered by side cover 40 when motorcycle 10 is viewed from the side. Thus, sealing member 141 at the side sections of tail lamp unit 100 is not visible when motorcycle 10 is viewed from the side.

As can be seen from FIG. 5, a forwardly protruding attachment boss 142 is formed in lamp body 140 and is attached using a screw 57 to attachment bracket 55.

An upper side cover 150 that covers an upper section of tail lamp unit 100 is disposed above tail lamp unit 100 and is attached to attachment bracket 55 using a screw 58. Upper side cover 150 is attached along with lamp body 140 to body frame 50, and more specifically is attached to rear stay 54.

(Structure of the Rear Fender)

Figure 7:
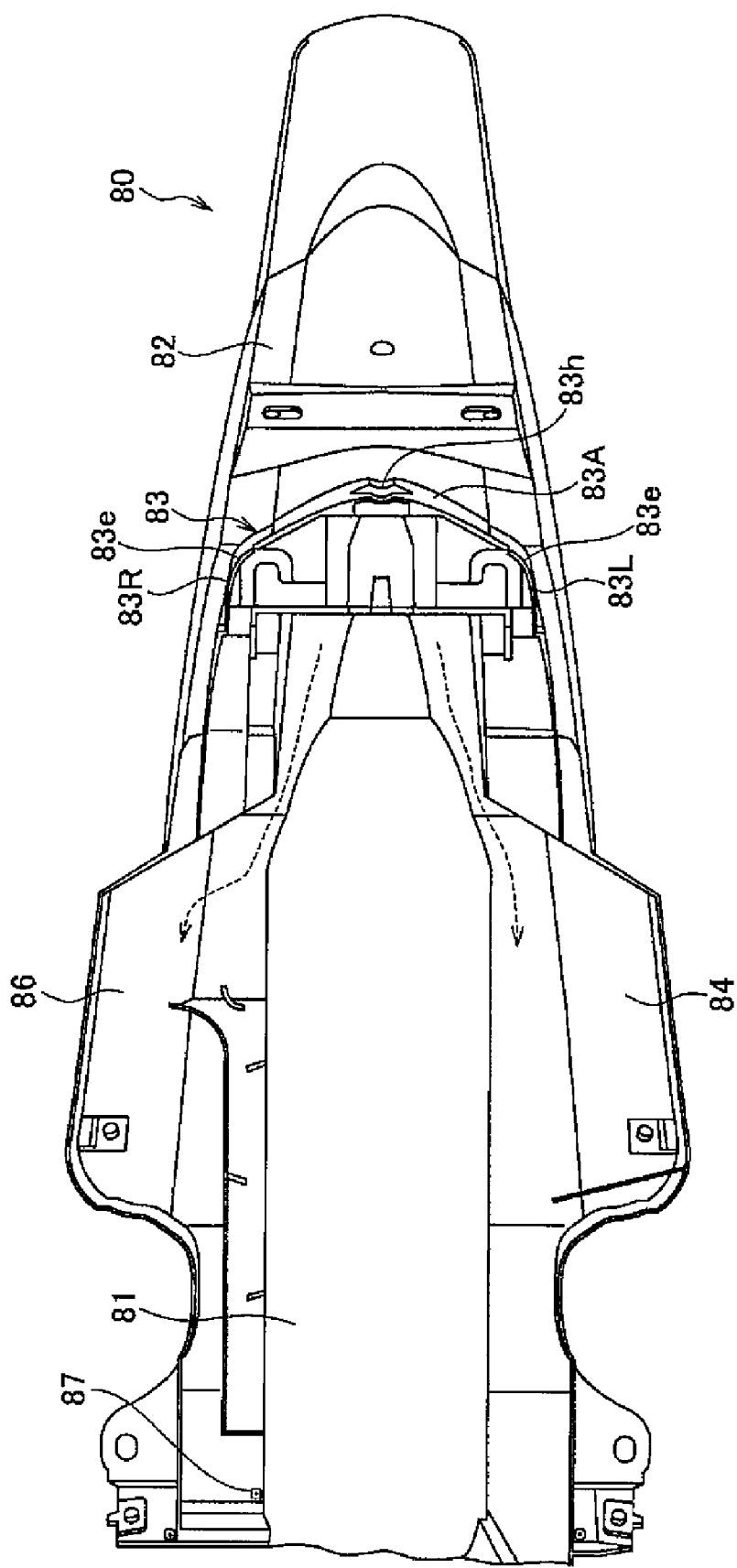
FIG. 7 is a partial plan view of the rear fender according to an embodiment of the invention.

Next, the structure of rear fender 80 is explained. As shown in FIG. 3, rear fender 80 is disposed below tail lamp unit 100. FIG. 6 is a perspective view of the rear fender 80 unit. FIG. 7 is a partial plan view of rear fender 80.

As can be seen from FIGS. 6 and 7, rear fender 80 includes an upper side fender 81 and a rear side fender 82. Upper side fender 81 is above rear wheel 90 and is generally circular in shape. Rear side fender 82 is behind rear wheel 90.

Rear fender 80 includes extending member 83 that extends upwards from rear side fender 82, and a gutter member 84 that is formed at a left side section of upper side fender 81. In one embodiment, rear fender 80 is made of polypropylene. Upper side fender 81, rear side fender 82, extending member 83 and gutter member 84 are formed as an integrated unit.

Extending member 83 is formed from vehicle width direction wall 83A and front-rear direction walls 83L, 83R. Vehicle width direction wall 83A protrudes upward from rear side fender 82, and extends in the vehicle width direction. A seat lock hole 83h is formed in wall 83A. A seat lock that is used to lock seat 70 is disposed inside seat lock hole 83h. Front-rear direction walls 83L, 83R are contiguous with tip sections 83e (vehicle width direction end sections) of vehicle width direction wall 83A, and extend toward the front of motorcycle 10.

Gutter member 84 is connected with an internal space 83 in formed by tail lamp unit 100, vehicle width direction wall 83A, and front-rear direction walls 83L, 83R. Gutter member 84 is a fluid guiding passage that guides fluid such as rain water from internal space 83 in toward the front of motorcycle 10 (shown by the dotted line in FIG. 7). Gutter member 84 may also receive fuel that has overflowed from the fuel tank.

A discharge port 85 formed in a front end of gutter member 84 discharges fluid from gutter member 84. Discharge port 85 is positioned between engine 60 and rear wheel 90.

A gutter member 86 is also formed at a right side section of upper side fender 81, and includes a drain hole 87 for discharging fluid (FIG. 7).

(Structure of Connecting Section of Tail Lamp Unit and Vehicle Body Cover)

Figure 8:
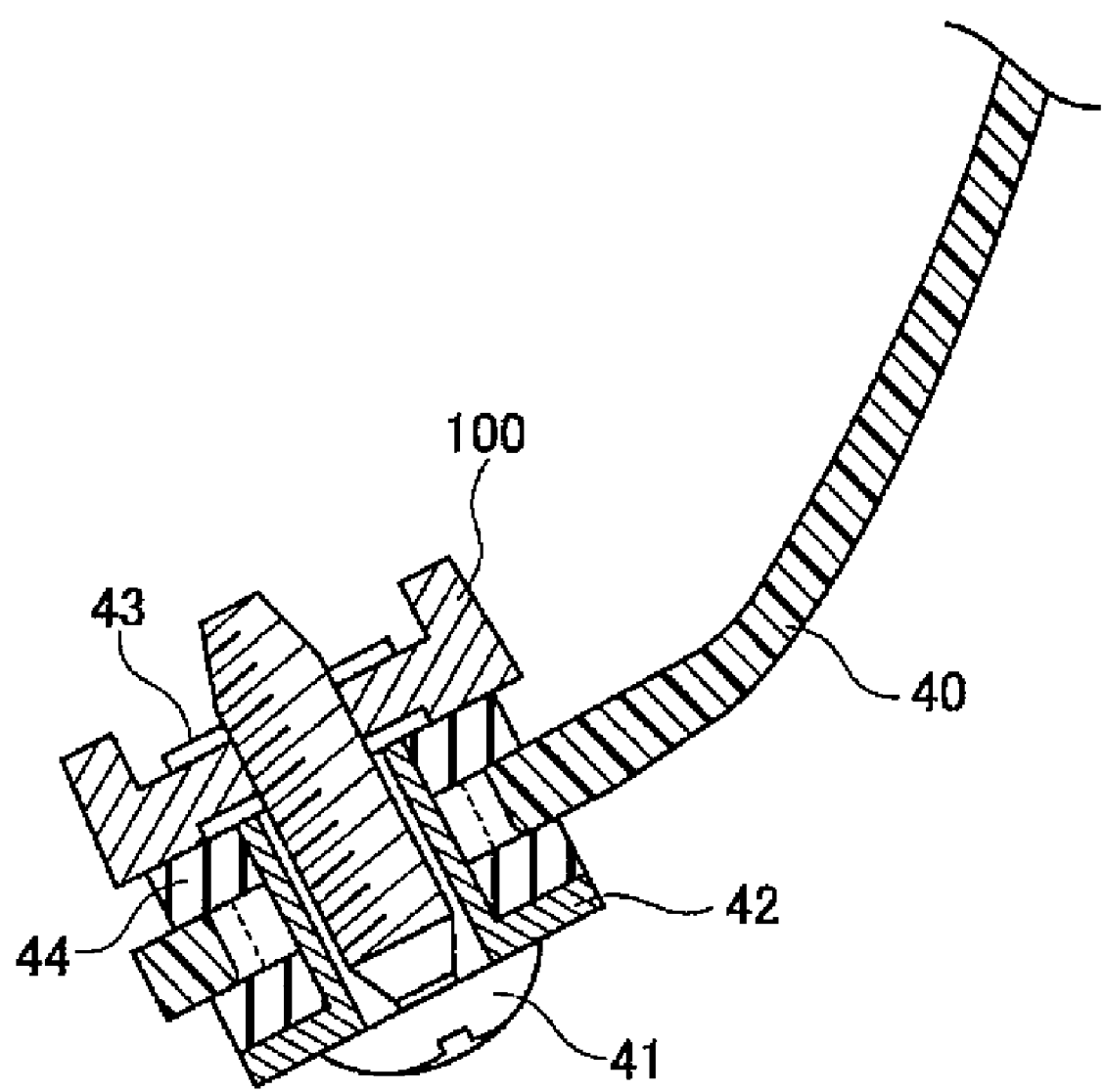
FIG. 8 is a cross sectional view along line F8-F8 of FIG. 1.

The structure of a connecting section of tail lamp unit 100 and vehicle body covers, namely, side cover 40 and upper side cover 150, is now explained. As can be seen from FIG. 8, which is a cross sectional view along line F8-F8 of FIG. 1, side cover 40 and tail lamp unit 100 are connected using a screw 41 and a spring nut 43. A collar 42 is attached between side cover 40 and screw 41. A grommet 44 is fitted to an attachment hole that is formed in side cover 40.

Figure 9:
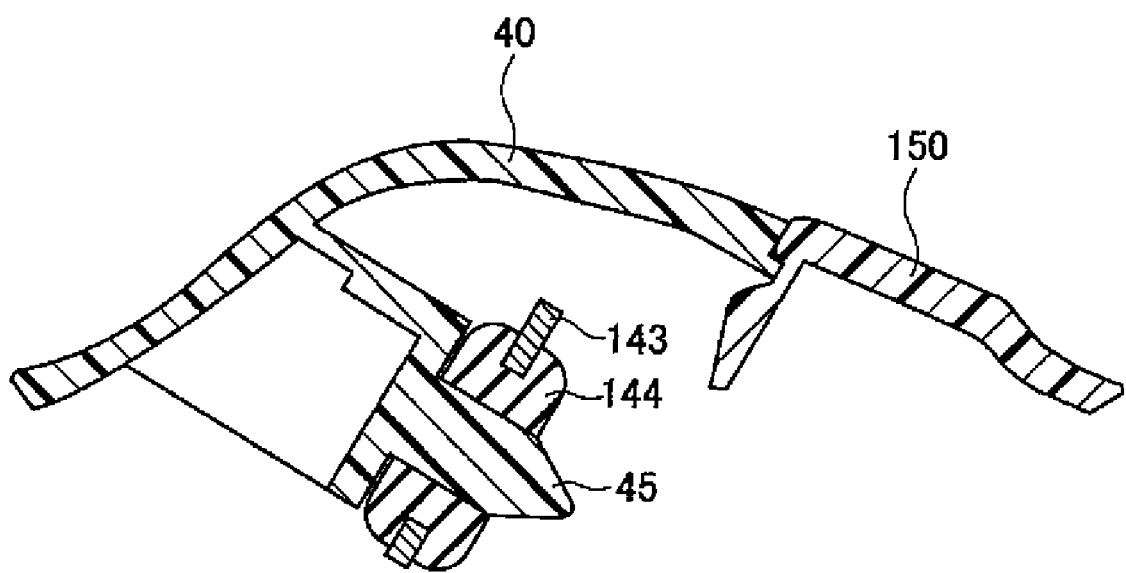
FIG. 9 is a cross sectional view along line F9-F9 of FIG. 5.

As shown in FIG. 9, which is a cross sectional view along line F9-F9 of FIG. 5, a protrusion 45 formed in side cover 40 is inserted into an attachment hole formed in a cover attachment member 143 of lamp body 140. A grommet 144 is fitted to the attachment hole.

OPERATION AND ADVANTAGES

In motorcycle 10, sealing member 141 that seals flasher lenses 110, tail lamp lens 120, and lamp body 140 is covered by vehicle width direction wall 83A on rear fender 80. As a result, entry of rain water or the like into tail lamp unit 100 is more reliably inhibited.

In motorcycle 10, sealing member 141 is not easily visible. More specifically, motorcycle 10 has a structure that makes it difficult to see sealing member 141 without using a separate member.

In addition, in this embodiment, front-rear direction walls 83L, 83R extend toward the front of motorcycle 10 and are contiguous with tip sections 83e of vehicle width direction wall 83A.

Furthermore, because vehicle width direction wall 83A is provided in rear fender 80, water spray that is thrown up by rear wheel 90 does not directly hit vehicle width direction wall 83A. Moreover, because front-rear direction walls 83L, 83R extend toward the front of motorcycle 10, spray of water from the side and front of motorcycle 10 is reliably inhibited from entering tail lamp unit 100 from sealing member 141.

In this embodiment, fluid that enters internal space 83 in formed between tail lamp unit 100 and rear fender 80 is guided toward the front of motorcycle 10 by gutter members 84 and 86. As a result, rain water or the like that enters internal space 83 in formed inside of extending member 83, which is provided so that sealing member 141 is not easily visible, is reliably discharged.

In this embodiment, tail lamp unit 100 and upper side cover 150 are attached to rear stay 54 using a shared attachment bracket 55. As a result, the structure in the periphery of tail lamp unit 100 is simplified. Furthermore, because the number of necessary attachment brackets is reduced, the weight and manufacturing cost of motorcycle 10 are reduced.

In this embodiment, lens surface 130a of license lamp member 130 extends in a generally horizontal direction. Thus, lens surface 130a is not visible from the rear of motorcycle 10.

Moreover, as a result of providing side walls 100e that protrude downwards at the periphery of lens surface 130a, damage of lens surface 130a caused by small stones or the like being thrown upwards by motorcycle 10 is inhibited. Further, because side walls 100e are formed at the sides of lens surface 130a, light radiated from lens surface 130a is inhibited from spreading outwards in the vehicle width direction.

In addition, side walls 100e extend along lower edge 40e of side cover 40 when motorcycle 10 is viewed from the side. More specifically, bottom surface 120b of tail lamp lens 120, which is provided with license lamp member 130, extends in a generally horizontal direction, and side walls 100e extend along lower edge 40e of side cover 40 rather than in the horizontal direction. Accordingly, a stronger impression is created that tail lamp unit 100 and side cover 40 are a single unit, and the external appearance of motorcycle 10 is improved.

OTHER EMBODIMENTS

The invention has been disclosed by describing an embodiment of the invention. However, the description and the drawings that form this disclosure do not limit the invention. It will be readily apparent to those skilled in the art that the disclosure can be used as a basis for various different embodiments.

For example, in the embodiment described above, license lamp member 130 is provided at bottom surface 120b of tail lamp lens 120. However, it is not essential that license lamp member 130 is provided at bottom surface 120b of tail lamp lens 120. Moreover, in the above-described embodiment, a special bulb is not provided just for use by a license lamp, and the tail lamp bulb is used in a dual purpose manner. However, a special bulb for the license lamp may be provided.

In the above-described embodiment, tail lamp unit 100 and upper side cover 150 are attached to rear stay 54 using attachment bracket 55. However, tail lamp unit 100 and upper side cover 150 may be attached to rear stay 54 using separate attachment brackets.

Furthermore, it is not essential to provide gutter member 84, gutter member 86 and front-rear direction walls 83L, 83R that are provided in rear fender 80.

In the above-described embodiment, sealing member 141 extends along the outer edge of tail lamp unit 100. However, a section of sealing member 141 of lamp body 140 and flasher lenses 110 (or tail lamp lens 120) may be cut away, thereby allowing rain water or the like that has entered tail lamp unit 100 to drain away.

The particular embodiments of the invention described in this document should be considered illustrative, rather than restrictive. Modification to the described embodiments may be made without departing from the spirit of the invention as defined by the following claims.

The invention claimed is:
1. A straddle-type vehicle comprising:
a rear wheel;
a tail lamp unit including a lens member and a lamp body;
a rear fender disposed between the rear wheel and the tail lamp unit;
a sealing member arranged to seal the lens member and the lamp body at a lower section of the tail lamp unit; wherein
the rear fender includes a vehicle width direction wall extending upwards from the rear fender and in a vehicle width direction;
the vehicle width direction wall is arranged to cover and conceal the sealing member when the vehicle is viewed from the rear such that the sealing member is not visible when the vehicle is viewed from the rear;
the rear fender and the vehicle width direction wall define a single unitary member;
a lower edge of the tail lamp unit extends rearward and upward;
a lower edge of the vehicle width direction wall is arranged at a position that is below a lower edge of the sealing member;
an upper edge of the vehicle width direction wall is arranged at a position that is above the lower edge of the sealing member; and
the vehicle width direction wall is arranged rearward of the sealing member.

2. The vehicle according to claim 1, further comprising front-rear direction walls connected with tip sections of the vehicle width direction wall and extending toward the front of the vehicle.

3. The vehicle according to claim 2, wherein the rear fender includes a fluid guiding passage that guides fluid that has entered a space defined by the tail lamp unit, the vehicle width direction wall, and the front-rear direction walls toward the front of the vehicle.

4. The vehicle according to claim 1, further comprising:
a body frame; and
a body cover arranged to cover the body frame, wherein the tail lamp unit and the body cover are attached to the body frame by an attachment bracket.

5. The vehicle according to claim 1, further comprising:
a body frame; and
a body cover arranged to cover the body frame, wherein the tail lamp unit includes a lens surface that radiates light onto a license plate, and
the lens surface is provided at a bottom surface of the tail lamp unit and extends in a generally horizontal direction.

6. The vehicle according to claim 5, wherein the tail lamp unit includes a wall that protrudes downward at a periphery of the lens surface.

7. The vehicle according to claim 6, wherein the wall of the tail lamp unit is provided at both sides of the lens surface.

8. The vehicle according to claim 1, further comprising:
side covers disposed along left and right sides of the vehicle; wherein
a boundary portion of each of the side covers is arranged adjacent to the tail lamp unit; and
the boundary portion includes an upper edge that extends upward and rearward, a lower edge that extends downward and rearward, and a connecting portion of the upper edge and the lower edge is arranged to be forward of the vehicle width direction wall.

9. The vehicle according to claim 1, wherein
the lens member is defined by an integral member including a tail lamp lens and flasher lenses disposed on left and right sides of the tail lamp lens; and
right and left side walls of the vehicle width direction wall are arranged inward of right and left sides of the rear fender.

* * * * *